(12) United States Patent
Noe

(10) Patent No.: US 7,322,230 B2
(45) Date of Patent: Jan. 29, 2008

(54) RUNOFF RAIN GAUGE

(76) Inventor: Stephen A. Noe, 12603 Hammersmith Dr., Tomball, TX (US) 77377

( * ) Notice: Subject to any disclaimer, the term of this patent is extended or adjusted under 35 U.S.C. 154(b) by 0 days.

(21) Appl. No.: 11/278,061

(22) Filed: Mar. 30, 2006

(65) Prior Publication Data

US 2006/0191333 A1  Aug. 31, 2006

Related U.S. Application Data

(63) Continuation-in-part of application No. 10/709,155, filed on Apr. 16, 2004, now Pat. No. 7,066,021.

(60) Provisional application No. 60/320,123, filed on Apr. 18, 2003.

(51) Int. Cl.
*G01W 1/00* (2006.01)

(52) U.S. Cl. .................. 73/170.17; 73/86; 222/420

(58) Field of Classification Search .............. 73/86, 73/170.17, 170.16; 222/420
See application file for complete search history.

(56) References Cited

U.S. PATENT DOCUMENTS 2,697,286 A   12/1954   Miller
2,923,148 A   2/1960   Kirkham et al.
5,279,151 A   1/1994   Coody et al.
5,323,317 A * 6/1994   Hampton et al. .............. 702/3
5,463,909 A   11/1995   Eldridge
5,531,114 A * 7/1996   Frager ..................... 73/170.17
5,594,185 A   1/1997   Winberry et al.
6,105,418 A   8/2000   Kring
6,702,517 B2 * 3/2004   Goddard ....................... 405/45
2003/0071737 A1* 4/2003   Nawathe ..................... 340/616

* cited by examiner

*Primary Examiner*—Andre J. Allen
(74) *Attorney, Agent, or Firm*—Daniel N. Lundeen; Lundeen & Dickinson, LLP

(57) ABSTRACT

Disclosed is a runoff rain gauge 100 which includes a collector tube 104, soil infiltration resistance medium 108, a runoff resistance flow element 113, a standard rain gauge 102, and runoff collection tube 114. Precipitation enters the collector tube 104 and is divided to flow into the infiltration medium 108 and runoff collection tube 114 via flow element 113. Total precipitation is read in standard rain gauge 102, runoff in tube 114, and soil infiltration in medium 108 is calculated by the difference between total precipitation and the runoff. Also disclosed are a runoff rain gauge 100 comprising: a seal leg 150 downstream from the runoff resistance flow element 113; a collector tube 104 mounted directly to the ground so that the bottom of the soil infiltration resistance medium 108 contacts the ground surface; and/or a horizontal capillary tube in the runoff resistance flow element 113 to insure self-sealing via capillary forces.

11 Claims, 8 Drawing Sheets

RUNOFF RAIN GAUGE

CROSS REFERENCE TO RELATED APPLICATIONS

This application is a continuation-in-part of application U.S. Ser. No. 10/709,155, filed Apr. 16, 2004, now U.S. Pat. No. 7,066,021, which claims the benefit of provisional application U.S. Ser. No. 60/320,123, filed Apr. 18, 2003.

BACKGROUND OF INVENTION

This invention relates to a device for capturing rainfall in both a standard rain gauge and a collector tube incorporating an outflow circuit for simulating runoff. The invention provides an estimate of the rainfall split between soil infiltration and runoff. In addition to measuring the total rainfall, the device estimates the amount of runoff, thereby providing an estimate of the soil infiltration by difference.

Prior art rain gauges measure the total amount of precipitation. This can be helpful to serve as a general indicator of how much total rain has fallen, as well as how often and how much irrigation must be provided for crops, for example. However, the prior art rain gauges fail to take into account how much water has run off from the soil, and how much has soaked in. Of course, the rainfall that runs off serves no benefit in irrigation for crops or other plant growth. There is a need in the art for measuring the amount of rainfall that has run off from the soil and/or the amount that has soaked in.

There are a variety of conventional rain gauges available on the market, including such designs as simple clear collecting tubes with ruler markings, ornate collecting tubes for decorating gardens, non-linear tubes with expanded low-end scales to improve readability and electronic gauges with accuracies to a hundredth of an inch. These devices are all designed to make the same measurement, specifically the amount of rain which falls in the vicinity of the rain gauge.

Generally, when rainfall reaches the ground, it splits into different flow paths. A small amount may be retained on plant surfaces or pond in small depressions along the ground surface. However, the bulk of the rainfall either (1) infiltrates the soil surface or (2) flows overland as runoff. Soil infiltration is of primary interest for agriculture and homeowners with lawns and gardens (who provide supplemental irrigation for plants), while the run off measurements are of interest to hydrologists monitoring lake levels, storm drainage and flood plains, for example. Both groups typically estimate the quantity of interest from the total rainfall using historically developed correlations or simple experience.

Infiltration rates are a function of several variables including soil type, compaction, water content, land slope and plant density, as well as the water depth above the soil. Infiltration rates are highest when the soil is very dry, but as precipitation continues and the soil moisture content increases, the infiltration rate declines and approaches a constant rate termed the soil percolation rate. Whenever the precipitation rate exceeds the infiltration rate, excess water accumulates on the surface and a portion of the excess is lost as runoff. The split to runoff therefore increases with both rainfall quantity and intensity. It is also apparent that the relative fractions of infiltration and runoff experienced with a rain event are not only expected to be site specific, but will also vary for identical rain events (quantity and intensity) based on the effects of recent weather on soil moisture content.

A desirable feature of a device measuring runoff would be design flexibility to fit various formats, including a remotely monitored, self-draining electronic design. The most popular design for electronic rain gauges utilizes a tipping bucket sensor. The sensor is similar to a seesaw with buckets on each end for collecting water. The sensor collects water in the elevated bucket, which becomes heavy upon filling and falls, triggering a signal and dumping the contents. The other side then becomes elevated and repeats the cycle. The tipping bucket sensor is simple, robust and accurate, and is therefore attractive for use in the electronic design for a runoff rain gauge. The device would also desirably include good access for reading the gauge and other monitoring and maintenance for all of the various formats.

When a significant percentage of soil infiltration comes from irrigation, a device measuring runoff would preferably be located inside the irrigation field to capture the effects of irrigation on soil moisture. This will usually require mounting the unit close to grade. A runoff rain gauge that provides a grade level mounting would also enhance accuracy by providing an extended core sample of maximum depth. Although an in situ mounting provides these features, lack of elevation for the core sample could make use of an in situ mounting problematic for a self-draining unit, since a sump pump would be required to return the runoff to grade. An alternate low-level mounting system providing both elevation for runoff drainage to grade and the benefits of an extended core sample is therefore preferred. Ultimately, further design simplification is also desirable.

SUMMARY OF INVENTION

The present invention measures both the quantity and quality of rainfall by approximating the amount of runoff, thereby providing an estimate for the rainfall infiltration into the soil as the difference between the measured rainfall and runoff.

In one embodiment, the invention provides a runoff rain gauge for measuring precipitation, soil runoff, and soil infiltration by difference. The gauge has a collector tube with an opening for receiving precipitation, an infiltration circuit providing a reference soil infiltration resistance in communication with the collector tube, a runoff circuit in communication with the collector tube providing runoff characteristics of a surface of the reference soil, and a runoff measuring device, for example, a runoff collection tube to receive runoff from the runoff circuit, and a measurement system for reading runoff to the runoff collection tube. The infiltration circuit can include a flow resistance medium. The medium can include a sample from the reference soil. The runoff circuit can include an air backflow seal between the collector tube and the runoff collection tube. The gauge can also include a balance line located between the runoff collection tube and a ground surface to maintain a backpressure head to the runoff circuit matching a water depth above the ground surface. The balance line can also include a ground connector attached to the balance line preferably having one or more apertures at a distal end, wherein the distal end of the ground connector is in contact with the ground surface. The gauge can include an insulating shroud located about the collector tube to shield against insolation and retard moisture evaporation from a soil reference sample. The collector tube can include a removable bottom closure with a preferably integral drain hole. The bottom closure can include a substantially vertical drip tube. The collector tube can include an open bottom cylinder to receive a sample of the reference soil upon direct insertion of the gauge in the reference soil at ground surface. The collector tube further can include a high level recorder. The high level recorder can include a rod coated with a water resistant material painted with a water soluble dye, and a cap positioned within the collector tube above the infiltration circuit and having a surface area smaller than a cross-sectional area of the collector tube. The runoff collection tube can include a drain valve. The gauge can include a standard rain gauge for measuring total precipitation.

The runoff rain gauge can also include a frame connected to the collector tube, a standard rain gauge and the runoff collection tube, wherein the frame is attached to a support to maintain the rain gauge and collector tube in a vertical orientation with opening above ground level to receive precipitation. The runoff gauge can also include an independently adjustable runoff resistance. The runoff circuit can include an upper horizontal tube and a lower horizontal tube, the horizontal tubes connected by an upstream vertical tube and a downstream vertical tube. The upper horizontal tube connects an outlet of the collector tube and an inlet of the runoff collection tube and includes a non-permeable plug therein, the lower horizontal tube includes a filter medium, and a screw is provided in the downstream vertical tube to adjust flow resistance.

The invention also provides a method for measuring rain runoff. The method includes: (a) collecting precipitation in a collector tube; (b) passing a first portion of the collected precipitation to an infiltration circuit providing infiltration resistance characteristics of a reference soil; (c) passing a second portion of the collected precipitation to a runoff circuit providing runoff characteristics of a surface of the reference soil; (d) collecting the second portion in a runoff collection tube; and (e) measuring the precipitation collected in the runoff collection tube. The method can further include: (f) developing a pressure imbalance wherein a head of water in the collector tube is greater than the backpressure head in the runoff circuit provided by a ground level water depth; and (g) passing water from the collector tube through the runoff circuit to restore pressure balance.

Also provided is a method for measuring rain infiltration in soil, including: (a) measuring total precipitation; (b) measuring rain runoff as described above; and (c) determining infiltration by the difference of the total precipitation and the rain runoff.

Also provided is a method for calibrating a runoff rain gauge with adjustable runoff resistance. The method includes: measuring an average maximum water depth for the reference soil and a maximum water depth for the collector tube during a rain event; and adjusting the runoff resistance in proportion to any difference between the measured average maximum water depth for the reference soil and the maximum water depth for the collector tube.

The invention also provides a method for measuring maximum water depths with a high level recorder. The method includes: (a) painting a rod with a water-soluble dye; (b) positioning the rod vertically inside a perforated tube; (c) anchoring the perforated tube on a reference soil; (d) allowing rainwater from a rain event to enter the perforated tube and dissolve the dye on the rod as the water level increases; (e) allowing the perforated tube to drain once the rain event subsides; (f) measuring the maximum depth of the water based upon the dye remaining on the rod; and (g) measuring the maximum depth of water on a soil infiltration surface inside a collector tube of a rain runoff gauge, wherein the gauge includes a painted rod positioned inside the collector tube.

Also provided is a method for cultivating plants growing in soil. The method comprises: (a) positioning a rain runoff gauge adjacent a soil location, wherein the gauge includes a collector tube, an infiltration circuit and a runoff circuit, the infiltration circuit providing an infiltration resistance having characteristics of the soil and the runoff circuit providing runoff characteristics of a surface of the soil; (b) collecting ambient precipitation in the collector tube; (c) passing a first portion of the collected precipitation through the infiltration circuit; (d) passing a second portion of the collected precipitation through the runoff circuit and collecting the precipitation in a runoff collection tube; (e) measuring the second portion of the precipitation passing through the runoff circuit; (f) measuring total precipitation; and (g) irrigating the soil as a function of the measured runoff and measured precipitation.

In one embodiment, the runoff rain gauge can incorporate a seal leg in the outflow circuit from the collector tube. The seal leg allows hydraulic decoupling of the gauge measuring runoff from the pressurized section of the outflow circuit providing resistance to runoff. An inlet section to the seal leg can be pressurized to provide resistance against runoff from the collector tube while sealing off the downstream circuit from pressurization.

The seal leg can be a U-tube or use more or less concentric outer and inner upright tubes, with side connections for directing runoff into and out of the seal leg. A side inlet of the seal leg can connect to the runoff line from the collector tube. A side outlet of the seal leg can attach to a vented drip chamber or remain detached for direct drip into the runoff collection tube. The side outlet can also incorporate a drip point wherein outflow water drips against atmospheric pressure.

The seal leg can attach to a balance line located between the seal leg and a ground surface. The balance line can include a ground connector attached to the balance line comprised of a base plate with anchor rod in contact with the ground surface and a seal cap with continuous straight bottom edge. The seal cap can extend substantially beyond the footprint of the base plate to form a thin, substantially continuous gap between the seal cap edge and ground surface.

Runoff from the collector tube in one embodiment of the concentric tube seal leg arrangement drips against pressure into the inlet section of the seal leg, flows through a down-flow area comprising the annular space between the inner and outer tubes to a bottom of the seal leg, into the inner tube and upwards to a horizontal turn into the side outlet connection. Runoff then exits the seal leg by dripping against atmospheric pressure.

The function of the seal leg can alternatively or additionally be provided by other similar configurations such as a U-tube seal leg, for example. The hydraulic performance of the U-tube seal leg is essentially the same as that of the concentric tube seal leg, with the inlet side of the U-tube functioning as the inlet section and down-flow area, and the outlet side of the U-tube functioning as the inner tube of the concentric tube leg.

Another embodiment includes an alternate mounting system for the runoff rain gauge wherein a collector tube containing a previously extracted core sample is directly coupled to the ground such that the bottom core surface and top ground surface are in direct contact. This configuration allows the runoff measurement system to be positioned above grade, thereby allowing runoff drainage to grade, while also effectively providing the accuracy of an extended core sample. The ground-coupled design is advantageous whenever a low level mounting is required, and is preferred for a self-draining unit such as an electronic gauge, for example with a tipping bucket sensor.

Another embodiment provides a self-sealing capillary action tube as the flow element in the runoff line, i.e. a sufficiently small diameter tube to provide for self-sealing via capillary action, thereby facilitating avoidance of inlet and outlet vertical barriers in the runoff line for sealing against air backflow.

The flow element can comprise an inner horizontal tube mounted concentrically in the runoff line, with annular end caps to support the inner tube from the runoff line and seal the annular space between the inner tube and the runoff line, thereby forcing flow through the inner tube.

DETAILED DESCRIPTION

The present invention provides a precipitation measuring device capable of simultaneously measuring rainfall and soil runoff during a rain event. Soil infiltration is thereby determined by difference.

Figure 1:
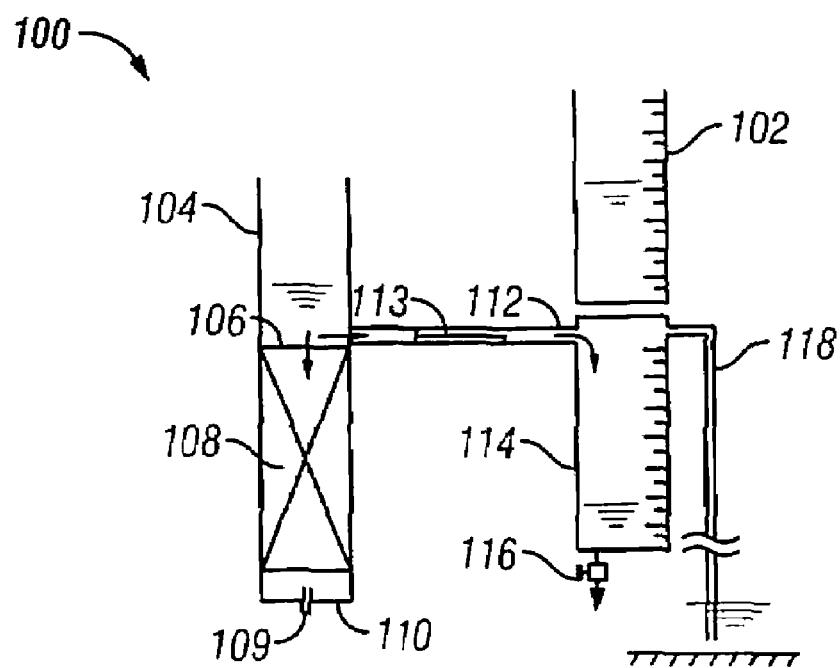
FIG. 1 is a simplified schematic drawing of the principal components of a runoff rain gauge in accordance with one embodiment of the present invention.

FIG. 1 illustrates one principal embodiment of the rainfall measuring instrument 100. The device consists of standard rain gauge 102, preferably including graduated markings for determination of rainfall amounts. The instrument 100 also includes a collector tube 104, which includes a flow resistance device 106. The flow resistance device 106 simulates soil infiltration resistance and is preferably comprised of a flow resistance medium 108. Preferably, the flow resistance medium 108 is comprised of a soil sample taken from the site being modeled, of sufficient depth to approximate the natural percolation rate of the soil. This approach allows the resistance to exhibit natural sensitivity to such factors as recent rains or extended dry periods. The soil plug is typically extracted from the ground by driving the lower barrel of the collector tube the required depth into the soil, and then twisting the barrel to break the plug loose from the ground. Very sandy soils that flow easily can simply be scooped into the barrel to provide the required sample. The bottom closure 110 includes a drain 109, ensuring evaporation from the medium 108 occurs principally from the top surface, while the drain allows the medium to be free draining after saturation.

Figure 1A:
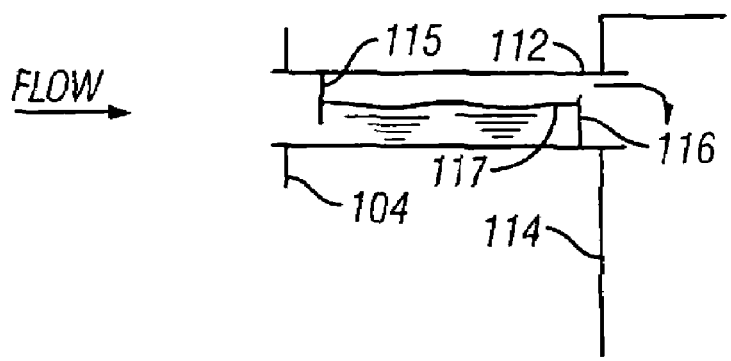
FIG. 1A is a detailed schematic drawing of the runoff line of the gauge of FIG. 1.

The device also includes a second (parallel) circuit 112, which exits the collector tube 104 directly above the flow resistance medium 108. The runoff line 112 includes flow element 113 which can provide resistance to runoff by maintaining a static pressure head opposing the water column height in the collector tube 104. As shown in FIG. 1A, flow element 113 can be comprised of two vertical barriers 115 and 116 adjoined in a horizontal tube. The first vertical barrier 115 extends down from the top of runoff line 112 to a passage at the bottom. A second vertical barrier 116 extends upward from the bottom of runoff line 112 to a passage at a height equal or greater than the bottom of the first barrier 115. In use, rain enters collector tube 104, a portion of the rainwater infiltrating the soil medium 108, while the remaining portion enters the runoff line 112. The runoff line 112 may include a nylon wick (not shown) or other hydrophilic material to minimize resistance to flow at low levels. Water entering runoff line 112 initially encounters the first vertical barrier 115, which it then flows underneath. To flow over the second vertical barrier 116, water accumulates to a height above the gap at first barrier 115, sealing off the air space downstream first vertical barrier 115 and preventing backflow of air into collector tube 104. As the water accumulates in the area between the collector tube 104 and the first vertical barrier 115, pressure increases until the water overflows second vertical barrier 116 into the runoff collection tube 114. The (horizontal) water level 117 between vertical barriers 115 and 116 must rise against the backpressure head resisting runoff to overflow vertical barrier 116.

Rain runoff is collected in runoff collection tube 114, which desirably includes graduated markings for measurement of total runoff during a precipitation event. The cross-sectional area and scale of collection tube 114 desirably correlate with the cross-sectional area and scale of collector tube 104. Runoff collection tube 114 includes a valve, stopcock, or similar device 116 located at the bottom of the runoff collection tube 114 for alternately retaining and releasing accumulated runoff. Runoff collection tube 114 also includes balance line 118, which connects the air space of runoff collection tube 114 to the ground surface. The balance line 118 serves to maintain a sealed system, while at the same time communicating the water head existing at the ground surface.

Figure 2:
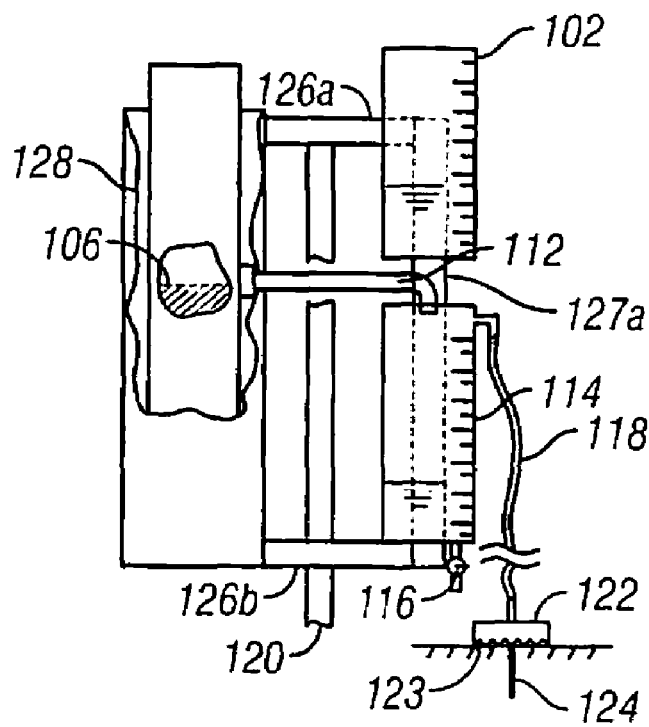
FIG. 2 is a schematic drawing of an alternate embodiment of the gauge of FIG. 1.
Figure 2A:
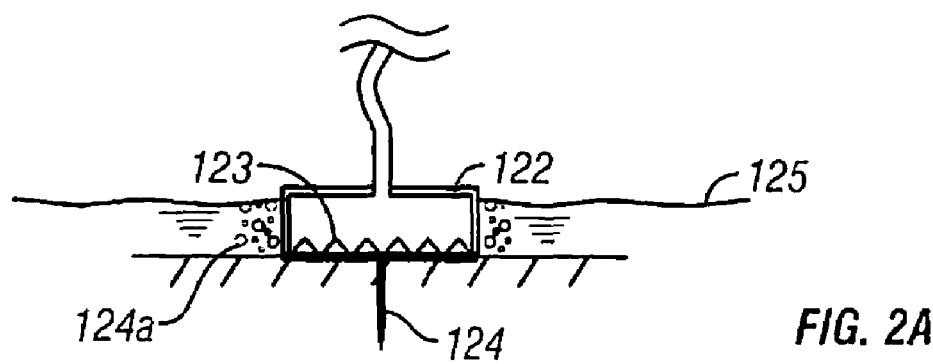
FIG. 2A is a detailed cross-sectional drawing of the seal cap of the gauge of FIG. 2.

As runoff flows into runoff collection tube 114, air displaced from the tube 114 exits through the balance line 118, located at or near the top of runoff collection tube 114. As shown in FIG. 2, the balance line 118 can be connected to a seal cap 122, secured to the ground surface via rod 124 and base 124(a). The air displaced out of the runoff gauge bubbles out the submerged bottom end of the seal cap 122, through apertures 123 located at the base of seal cap 122. The seal cap is shown in greater detail in FIG. 2A. The head of water 125 above the apertures 123 backpressures the air in the balance line 118, runoff collection tube 114 and the air space in the runoff line 112. In effect, the resistance to runoff for the modeled terrain (as reflected by the depth of the water at ground level) is automatically transferred from grade level to the runoff rain gauge, thereby circumventing the need for calibration as is required for a stand-alone runoff resistance. The outlet of the balance line circuit, as represented by the apertures 123 located within seal cap 122, is carefully anchored at grade level with the rod 124 or other means for securing the seal cap 122 with the base 124a abutting the ground surface below the apertures 123, and accurately transfers the developing ground-level water depth to the unit 100.

In practice, the process wherein runoff is induced to restore hydraulic balance occurs in very small steps on a relatively continuous basis. The process may occur during all phases of a rain event, including while the ground-level water depth is building, while it is holding steady, and while it is declining. As water depth declines, imbalances develop as the ground-level seal declines, rather than as the collector tube 104 head builds, causing water stored in the collector tube 104 to run off. Priming the circuit 112 and balance line 118 seals induces a positive pressure in the runoff collection tube 114, requiring proper joint seals for an airtight design.

As illustrated in FIG. 2, an alternate embodiment includes a mounting frame consisting of two parallel horizontal bars 126(a), 126(b) and two parallel vertical bars 127(a), 127(b) (127(b) not shown) which secure the standard rain gauge 102, the collector tube 104, and the runoff collection tube 114. The frame is mounted to a vertical rod 120, allowing the device to be oriented in any direction desired by the operator. Alternatively, a shorter vertical rod can be used with appropriate clamps for mounting the device to a stationary object, such as for example a fence.

Figure 3:
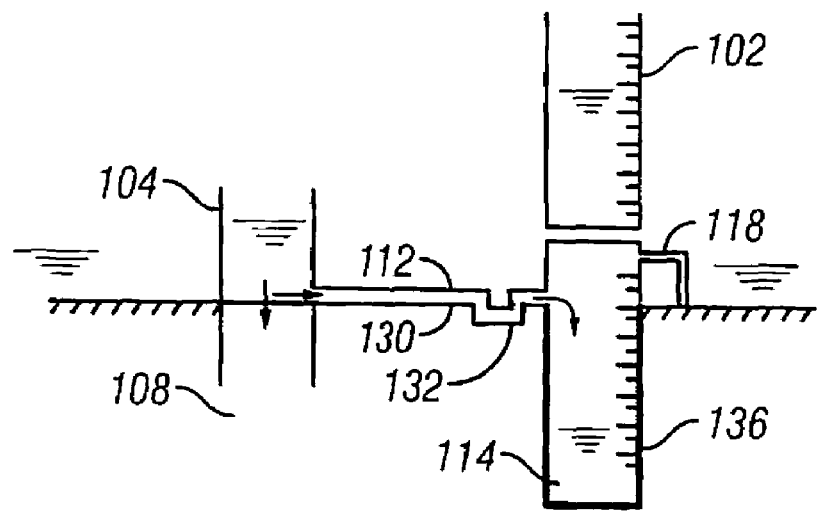
FIG. 3 is a schematic drawing of an in situ runoff rain gauge according to another embodiment of the invention.

FIG. 3 illustrates an alternate embodiment of the rain and runoff measurement device wherein in situ measurements of the runoff are recorded. This design does not require extraction of a core soil sample to simulate the soil infiltration resistance. Instead, the in situ gauge is mounted at grade level by inserting the collector tube 104 directly into the ground. The inlet of circuit 112 is preferably positioned at grade level. The runoff circuit 112 preferably creates an air backflow seal loop 132, shown in FIG. 3 as a U-shaped tube. Runoff collection tube 114 is mounted below grade, preferably in a holder 136. Runoff collection tube 114 is connected to runoff line 112 with a simple coupling, allowing easy removal of tube 114 to read the collected runoff and/or empty the contents. The device also includes a balance line 118 to read ground water depth. Performance of the balance line 118 has been previously described. The in situ device has the advantage of most accurately maintaining the original conditions of the soil infiltration sample.

Figure 4:
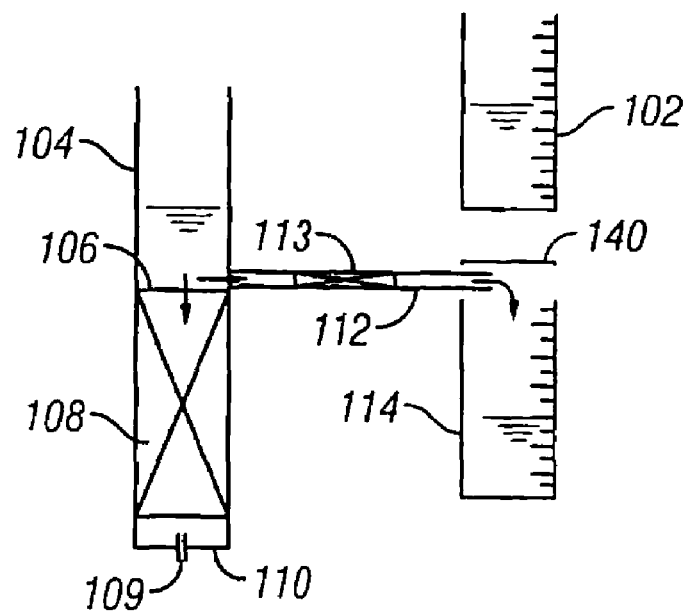
FIG. 4 is a simplified schematic drawing of a runoff rain gauge with an independently adjustable runoff resistance according to another embodiment of the invention.

FIG. 4 illustrates another embodiment of the design for a rainfall-measuring instrument, which provides an estimate of the rainfall split between soil infiltration and runoff. In addition to measuring the total rainfall, the device estimates the amount of runoff, thereby providing an estimate of the infiltration by difference. Rainfall is captured in both a standard rain gauge 102 and a collector 104. The lower section of the collector tube contains a flow resistance device 106 to simulate the soil infiltration resistance. The preferred device for providing this resistance is to use a flow resistance medium 108 comprised of a plug of the upper soil layer of interest. A removable bottom closure 110 is included for collector tube 104 to ensure evaporation from the medium occurs principally from the top medium surface. The bottom closure 110 includes an integral drain hole 109 to allow for free drainage of the medium 108.

The device also includes a second (parallel) circuit 112, exiting the collector tube 104 immediately above the flow resistance medium 108, which contains a flow element 113 serving as an independently adjustable resistance to simulate the resistance to runoff. The flow element 113 is desirably adjustable to simulate the local effects of slope, flow path length and roughness (vegetation density) on water depth. Flow through the runoff circuit 112 is collected in a runoff collection tube 114 whose cross-sectional area and scale desirably correlate with the area of collector tube 104. A cover or hood 140 is attached to runoff collection tube 114 to prevent rainfall from entering tube 114. Electronic rain gauges can be used for remote monitoring and interfacing to automated control systems.

To provide useful information, the two parallel flow resistances in the unit, the soil infiltration circuit and the runoff resistance circuit, must accurately represent the corresponding resistances to soil infiltration and runoff for the area of interest. The accuracy of the soil infiltration resistance can be insured by incorporating a sample of the soil of interest into the unit. The accuracy of the runoff resistance is more difficult to provide. In the embodiment of FIG. 4, an adjustable flow element 113 is calibrated to provide a resistance, which preferably results in the same level of water developing on top of the soil sample during a rain event as the average level developed on the ground area of interest. This embodiment benefits from the simultaneous measurements of water depths at multiple locations across a desired area as well as in the unit itself, and subsequent calibration of the runoff measurement device.

If the area being modeled by a single unit is not too large, the maximum water depths experienced at all locations will occur near the same time in a rain event, typically near the end of the most intense period of rain. Measuring the maximum water levels which develop at various locations across the area being sampled, as well as inside the collector tube 104, provides simultaneous measurement of the water levels in both the modeled area and the unit.

Figure 5:
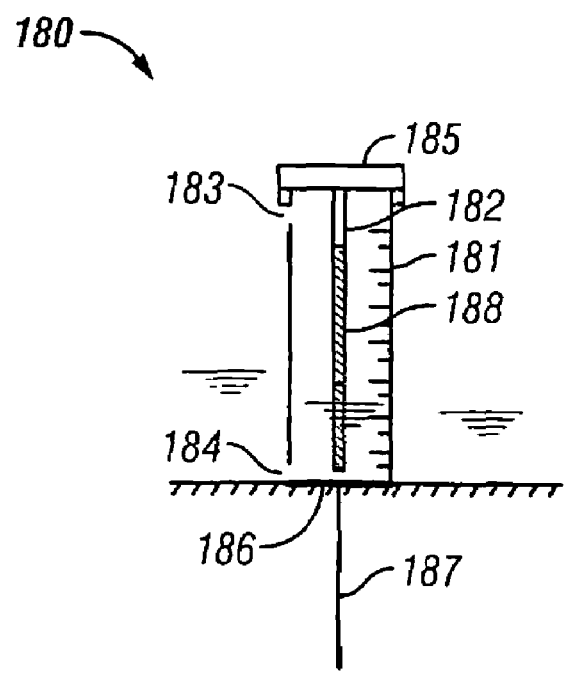
FIG. 5 is schematic drawing of a high-level recorder for taking ground level water measurements according to another embodiment of the invention.
Figure 6:
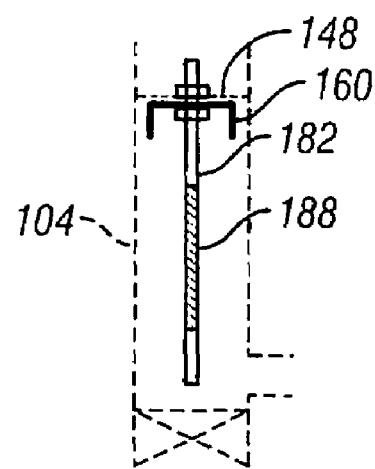
FIG. 6 is a schematic drawing of a high-level recorder for taking measurements in the collector tube according to another embodiment of the invention.

Several measurements are desirably taken to provide a good approximation of the average depth for the area of interest. FIGS. 5 and 6 illustrate designs for simple yet effective high-level recorders for measuring the maximum water depth developed at a specific location and during a specific precipitation event. The design 180 for recording ground levels, shown in FIG. 5, has a hollow tube 181, closed at both ends, with holes located at the bottom 184 and top 183 of the tube 181. A bottom hole or aperture 184 allows water to enter and leave the tube 181, while the top hole 183 serves as a vent, allowing air within the tube 181 to be displaced. The top closure 185 is removable, and has a dipstick rod 182 attached to it of about the same length as the tube height. The rod 182 is covered with a textured water-repellant material and painted with a water-soluble dye 188 of a color that contrasts well with the water-repellant material covering the rod 182. A second rod 187, or similar device, extends from the bottom closure 186, and anchors the unit to the top of the soil.

The high level recorder 180 is positioned by holding the gauge vertically and inserting the bottom rod 187 into the ground until the bottom tube closure 186 stops flush with the ground. The bottom rod 187 holds the gauge 180 securely in place. The design buffers the interior of the gauge 180 from waves and splashing external to the tube, providing a stable internal level. As the water level rises in the recorder 180, the water-soluble dye 188 is washed off the dipstick 182, leaving a clear interface on the rod 182 designating the highest level reached during the rain event. As the rain subsides and the external level drops, the water and washed-off dye flow out the bottom hole 184. A defined color interface is produced on the rod since (1) the internal level is kept stable and (2) the coating on the rod 182 is water repellant and therefore does not smear the interface by wicking the water upwards.

FIG. 6 illustrates another embodiment for recording high levels in the unit. In this embodiment, a dipstick rod 182 is mounted to the center of the top debris screen 148. The embodiment includes a hat or cover 160 immediately below the screen 148 to divert rainwater toward the wall of the collector tube 104, preventing water from running down the dipstick rod 182. The screen 148 and hat 160 also prevent direct impact of rain on the water surface, thereby preventing splashing and insuring a stable water level.

The high level recorders do not require maintenance in their use during a rain event. Prior to the rain event, the dipstick rod is painted with the water-soluble dye. After the event, the high level recorders are collected, the interface levels are measured and averaged, and the result is compared to the maximum level measured in the unit's collector tube 104.

Figure 7:
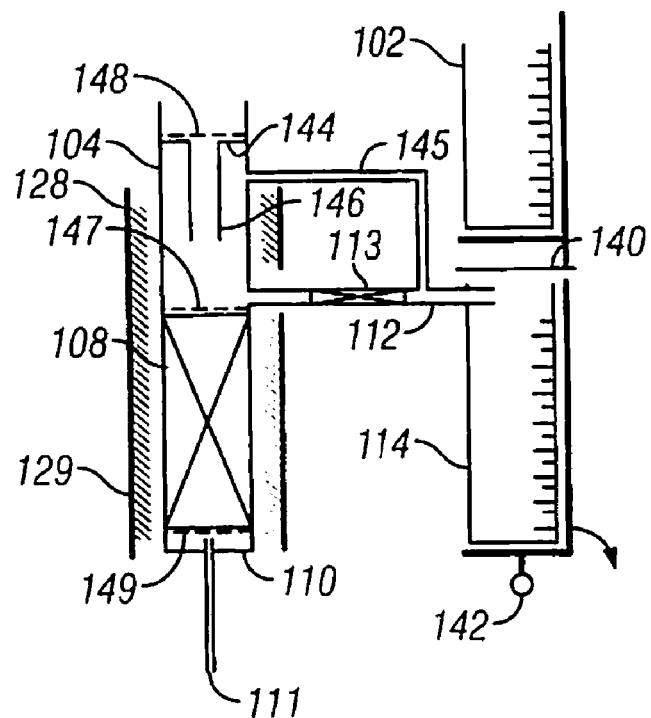
FIG. 7 is a schematic drawing of secondary features of the runoff rain gauges of FIG. 1 and FIG. 4.

FIG. 7 illustrates some secondary features for the rainwater measuring device, including an overflow tube 145 to limit the maximum water depth where desired (e.g. limit water depth to the grass cut level on lawns), and a pivoting mount 142 with bottom anchor to provide for easy draining of the gauges. A shroud 128, having internal insulation 129, shields the sides of the collector tube 104 from direct sunlight, preventing excess evaporation. Evaporation can be further moderated with an internal pan 144 and downtube 146 to reduce the available area for diffusion and convective cell formation. Screens 147, 148 and 149 are used to buffer raindrop impact, support the soil sample, and keep debris out of the runoff stream.

The collector tube bottom closure 110 ensures evaporation occurs principally from the top surface of the resistance medium 108. A drain hole in the bottom closure 110 allows the medium 108 to drain freely. Drainage occurs whenever the wetting front moving through the medium 108 reaches the bottom of the medium bed, corresponding to full saturation of the bed. For media exhibiting hygroscopic properties, as is typical with most soils, full saturation can result in a sudden drop in infiltration rate due to the loss of the capillary suction force in the medium 108, typically referred to as the wetting front suction head. The drop in infiltration rate can be suppressed by including a substantially vertical drip tube 111, in lieu of a simple drain hole, for the bottom closure. When drainage to the bottom closure commences, the drip tube 111 primes up and induces a vacuum to the bottom of the resistance medium 108, significantly compensating for the loss of the wetting front suction head while still providing for free drainage of the medium bed.

The water depth in the collector tube affects both the driving force for infiltration and the total time during which a water layer is available to supply infiltration. The depth controlled by the runoff circuit is a function of the localized runoff alone, as compared to the land area of interest where depth at any point is a function of hydraulic gradients resulting from the cumulative runoff for the surrounding area. However, the two depths are closely linked as direct responses to excess rainfall exceeding the infiltration rate, and therefore can be proportionally correlated.

Water has a relatively high surface tension, which creates difficulties in designing a flow circuit to operate with a very low head. The water tends to be reluctant to flow onto dry (non-hygroscopic) surfaces and release from wet surfaces. Significant head, or differential water pressure, may be required to initiate flow through a dry fine mesh filter. Flow components with small cross-sectional areas frequently develop a form of vapor lock at the inlet end during dryout, requiring significant head to drive the resulting bubble through the circuit when water flow is reestablished.

Figure 8:
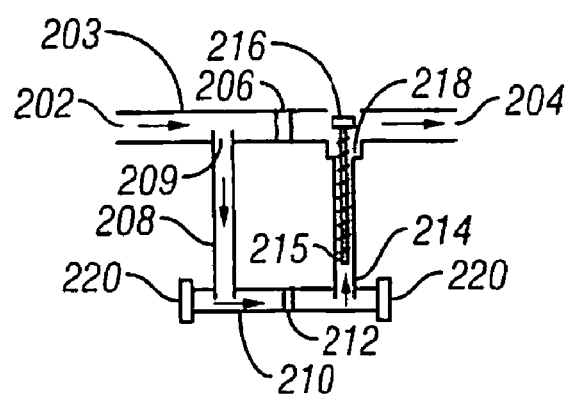
FIG. 8 is a schematic drawing of a runoff resistance circuit according to another embodiment of the invention.

An alternate embodiment of the flow resistance device developed for an independently adjustable runoff resistance component 113 addresses these concerns, insuring that priming and flow is established at very low water depths and in various stages of unit dryout. The circuit design 200 is illustrated in FIG. 8, and employs two horizontal and two vertical tubes. The top horizontal tube 203 is comprised of inlet section 202 and outlet section 204 and is partitioned with a simple plug 206. Flow enters the top horizontal tube 203 through inlet 202 and flows down the vertical downtube 208 to the bottom horizontal tube 210. The stream flows into the bottom horizontal tube 210 and through a filter element 212, which protects the downstream flow element 216 against plugging. Flow then enters the bottom of the vertical uptube 214, which includes flow control element 216, which comprises the bulk of the flowing resistance for the circuit 200. Water flows upwards through the element 216 and returns to the top horizontal tube 203 where it disengages from the flow resistance element 216 and flows towards the outlet end 204 into a downstream runoff collection tube 114 (see FIG. 7) for collecting the runoff.

The design of the circuit 200 allows the unit to develop significant available head (difference in liquid levels in the two vertical tubes) for initiating flow through both the filter 212 and flow element 216. Head develops once spillover into the downtube 208 begins, and increases as the level in the downtube 208 rises. Once full flow is established and the waterfront reaches the outlet 218 of the flow element 216, the net head through the unit decreases to essentially the available head at the inlet 209 of the downtube 208. The vertical upflow design of the flow element 216 insures the element will dry out from the outlet 218 towards the inlet 215, further guarding against vapor lock if the unit primes up before complete dry out.

The flow element 216 is preferably designed to exhibit laminar flow whereby the relation between flow and head is linear. This more closely approximates the relation between runoff rate and depth than would be seen in turbulent flow, where head varies with the square of the flow. Other approaches such as thin tubes, packed tubes or narrow spillover weirs could also be used to provide a suitable response to runoff. Thin tubes and packed tubes would again produce a laminar response, while a narrow spill-over weir would produce a milder response of head to flow where head varies by a factor of an exponent of 2/3 on the flow. In packed tubes, the resistance medium must be carefully selected to properly simulate the flow resistance exhibited by the terrain. Spillover weirs may better approximate the relation between flow and head in certain cases such as for relatively smooth surfaces (i.e. thin vegetation) as well as level surfaces where the principal driving force for runoff is water depth rather than slope. However, the relatively large capacity of even a very narrow weir slot, rectangular or triangular in shape, would require the use of a much larger collector tube and soil sample to load up the slot sufficiently to generate accurate water depths. The use of a laminar element for these cases is still considered acceptable since infiltration rate is not a strong function of water depth, so moderate deviations in unit water depth will not significantly affect the simulated runoff.

The design for the flow element 216 illustrated in FIG. 8 incorporates a screw-in-tube-type design, such that the screw threads tightly fit, or score, the inside of the tube wall, sealing against bypass. Flow therefore spirals upwards along the groove between the threads. The resistance is adjusted by turning the screw to drive it into or out of the surrounding tube, thereby increasing or decreasing the flow path length through the element. A similar type of effect can be achieved with a bolt in a threaded tube or coupling, wherein the ends of the bolt threads and/or tube threads are partially ground off to create the flow path. This provides a good seal between threads while avoiding dust formation, which can occur when the resistance of the screw in tube design is adjusted. Additionally, removable transparent end caps 220 attached to the ends of the bottom horizontal tube 210 facilitate inspection and cleaning of the filter element 212.

The design illustrated in FIG. 8 makes calibration of the unit simple, because the resistance is linearly proportional to the active screw length. After a rain event, level recorders 180 are collected, the interface levels are measured and averaged, and the result compared to the maximum level measured in the collector tube 104. The resistance is then adjusted as required to raise or lower the level that would develop if the same rain event were repeated.

Figure 9:
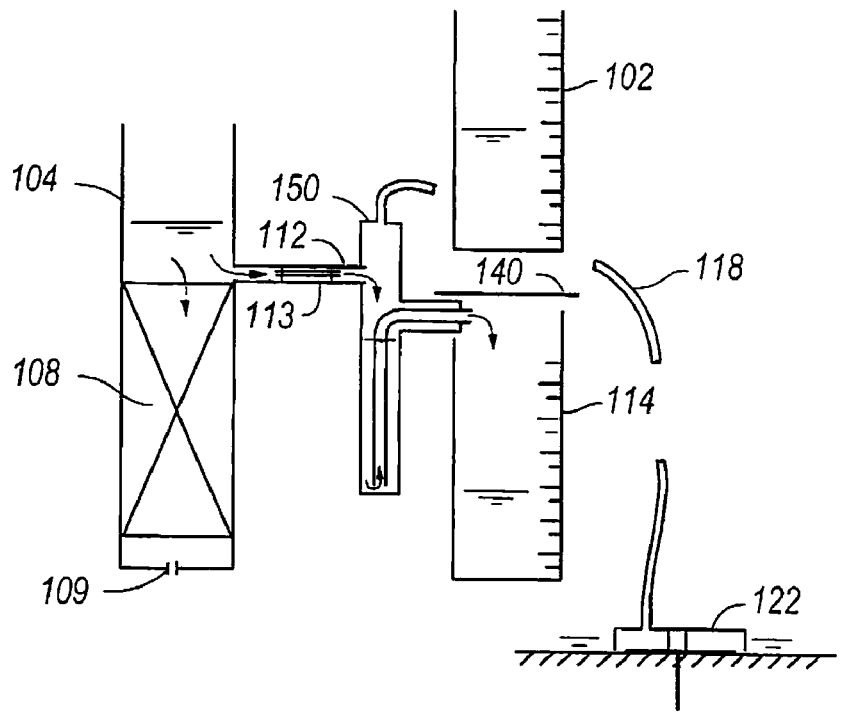
FIG. 9 is a simplified schematic drawing of the principal components of a runoff rain gauge incorporating a seal leg in accordance with one embodiment of the present invention.

FIG. 9 illustrates the principal components of a runoff rain gauge 100 in accordance with one embodiment of the invention. The design incorporates a seal leg 150 in the runoff outflow circuit from the collector tube 104. The seal leg 150 hydraulically decouples the runoff-measuring gauge 114 from the pressurized section of the outflow circuit providing resistance to runoff. The seal leg 150 can be pressurized to provide resistance against runoff from the collector tube 104. A balance line 118 connects the top of the seal leg 150 to a seal cap 122 located at ground level. The seal leg 150 receives flow from the runoff line 112 and flow element 113 (discussed in more detail below in connection with FIG. 14) and discharges flow to the runoff collection tube 114. A cover or hood 140 can be located above runoff collection tube 114 to exclude rainfall.

Figure 10:
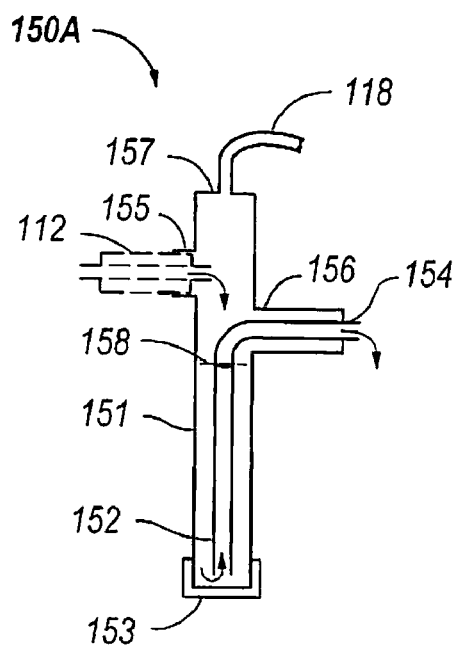
FIG. 10 is a schematic drawing of the principal components of a concentric tube seal leg that can be utilized in the gauge of FIG. 9.

FIG. 10 illustrates the principal components of a concentric tube seal leg 150A that can be used for the seal leg 150 service. The concentric tube seal leg 150A can include an outer upright tube 151 and inner tube 152 having an upright portion defining an annulus between the tubes 151, 152, with lateral connections for directing runoff into and out of the concentric tube seal leg 150A. The side inlet 155 can hydraulically connect the concentric tube seal leg 150A to the runoff line 112 from the collector tube 104. The side outlet 156 can include a lateral portion of the inner tube 152 extended transversely through a seal to terminate at a detached end 154 for direct drip into the runoff collection tube 114. The side outlet 156 thus provides a drip point at end 154 wherein outflow water from the inner tube 152 drips against atmospheric pressure.

The inner tube 152 can have an open bottom end adjacent the bottom of the outer tube 151, and can incorporate an elbow, e.g. a 90° elbow, to allow the upper part of the tube 152 to extend transversely through the side outlet 156. The top closure 157 of the outer tube 151 can attach to the balance line 118 hydraulically located between the concentric tube seal leg 150A and a ground surface. The outer upright tube 151 can include a preferably removable bottom cap 153 to facilitate cleanout of the concentric tube seal leg 150A.

Figure 11:
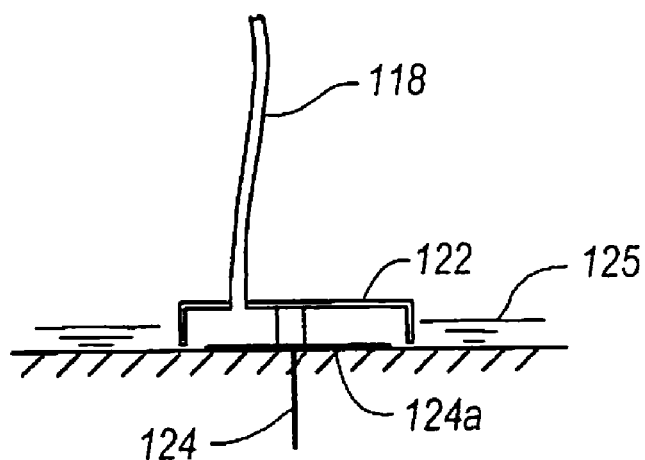
FIG. 11 is a detailed cross-sectional drawing of the seal cap used with the seal leg of FIG. 9.

The balance line 118 can attach to a ground connector as detailed in FIG. 11. The ground connector in this example is comprised of a base plate 124a with anchor rod 124 in contact with the ground surface and a seal cap 122 with continuous straight edge extending substantially beyond the footprint of the base plate 124a. The thin, substantially continuous gap formed between the bottom edge of the seal cap 122 and ground surface provides for hydraulic coupling of the balance line to any liquid head over the gap.

Designs for the runoff rain gauge 100 incorporating a seal leg 150 do not store runoff in the pressurized section of the outflow circuit, and therefore do not induce bubbling from the ground level seal cap 122. The cap 122 therefore uses a continuous or straight peripheral bottom edge, compared to the aperture notches on the cap bottom edge of FIGS. 2 and 2A, with minimal clearance to the ground to hydraulically couple with any liquid head present on the ground at the cap 122. Runoff is collected and/or measured downstream of the atmospheric drip point 154 exit the seal leg 150.

A rising ground water level 125 seals the ground level seal cap 122 and pressurizes the air pocket inside the cap 122. Air displaced up the balance line 118 pressurizes the inlet section of the concentric tube seal leg 150A, pushing the annular water level 158 below the elevation of the atmospheric drip point 154. Water from the collector tube 104 flows through the runoff line 112, drips against pressure in the inlet section of the concentric tube seal leg 150A, flows downward through the annular space between the outer tube 151 and inner tube 152, flows up through the inner tube 152 and exits via dripping against atmospheric pressure.

An important consideration is the ratio between the horizontal area inside the ground level seal cap 122 and the annular area comprising the cross-sectional down-flow area in the concentric tube seal leg 150A. The larger the ratio, the smaller the error induced by having a water level underneath the seal cap 122 higher than the edge of the cap 122. For example, using a design with an area ratio of 3:1 means that when the ground water level is 1" high, the water level underneath the seal cap 122 will come up about 0.25" above the cap 122 edge, resulting in about 0.75" of water head pressurization in the concentric tube seal leg 150A, thereby supporting an equivalent water height in the collector tube 104. The error in the transmitted ground water level is therefore about 25%. In one preferred embodiment, the design for the concentric tube seal leg 150A and cap 122 provides an area ratio of at least about 4:1, at least about 10:1, or at least about 100:1, corresponding to respective errors of only 20%, 9% or 1% in the transmitted ground water level.

Figure 12:
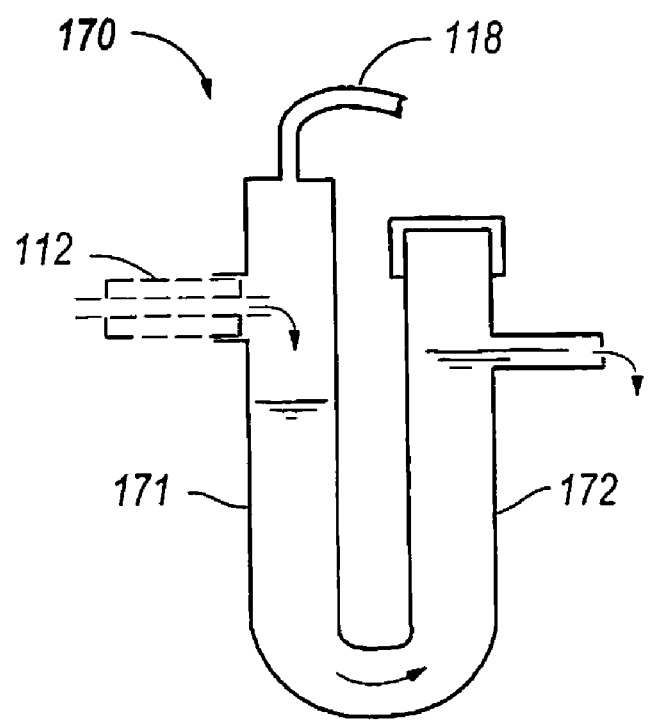
FIG. 12 is a schematic drawing of a U-tube seal leg that can be used as an alternate to a concentric tube seal leg in the gauge of FIG. 9.

The function of the seal leg 150 can also be provided by other similar configurations such as the U-tube seal leg 170 illustrated in FIG. 12. The hydraulic performance of the U-tube seal leg 170 is essentially the same as that of the concentric tube seal leg 150A, with the inlet side 171 of the U-tube 170 functioning as the outer tube 151 and annular space of the leg 150A, and the outlet side 172 of the U-tube 170 functioning as the inner tube 152 of the leg 150A. Previous comments regarding the performance of the concentric tube seal leg 150A are similarly applicable to the U-tube seal leg 170 using this correspondence. While the concentric tube seal leg 150A is generally preferred over the U-tube seal leg 170 since, for a given tube size for both the U-tube 170 and seal leg 150A outer tube 151, the annular area of the leg 150A is less than the cross-sectional area of the U-tube 170 and ground water level is therefore more accurately conveyed in the seal leg 150A than the U-tube 170, the U-tube 170 can be advantageous for simplicity of construction where accuracy is less important and/or where the U-tube 170 has a smaller tube diameter.

Figure 13:
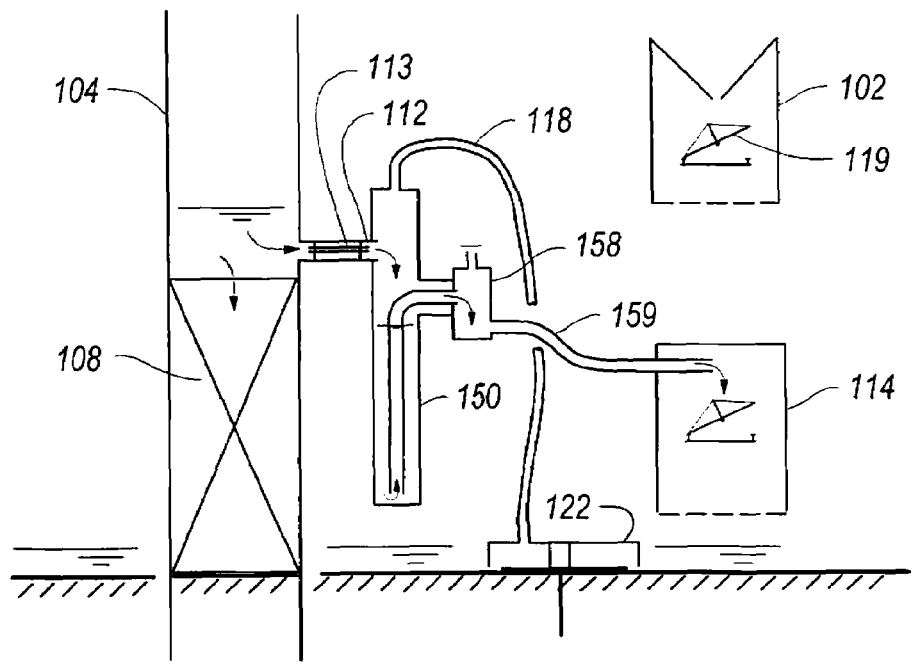
FIG. 13 is a schematic drawing of an electronic design for a runoff rain gauge incorporating a ground-coupled core sample and vented atmospheric drip chamber in accordance with another embodiment of the present invention.

FIG. 13 illustrates another embodiment of the invention including a low level mounting that is beneficial for use with an electronic design for the rain and runoff measurement device. An alternate mounting system is shown wherein a core soil sample 108 is placed into the collector tube 104, and the collector tube 104 containing the core soil sample 108 is directly coupled to the ground such that the bottom surface of the core 108 and top ground surface are in direct contact. This configuration elevates the top surface of the core 108 above grade, allowing runoff drainage to grade, while also effectively providing the accuracy of an extended core sample. The length of the collector tube 104 below the runoff line 112 is sufficient to encompass the targeted height of the extracted core sample 108 plus the required submergence below grade for mechanical stability. The design is applicable whenever a low-level mounting is required, and is preferred for the self-draining electronic format.

For example, for a gauge mounted with an 8" core sample 108 directly coupled to the ground and 4" submergence of the collector tube 104 for mechanical support, a segment length of about 12" from bottom of the collector tube 104 to the outlet connection for the runoff line 112 is required. The collector tube 104 is first inserted 8" into the ground to extract a core sample 108. The core is preferably taken from soil near the desired mounting site having similar characteristics to the soil at the mounting site, but at a sufficient distance so as not to impact gauge performance or installation at the mounting site. The tube 104 is then positioned at the mounting site and inserted 4" into the ground. As the tube 104 is inserted into the soil at the mounting location, the ground surface can push the core sample 108 up an additional 4" until the top surface of the core 108 adjoins the outlet connection for the runoff line 112. Water percolating through the core sample 108 continues percolating downwards into the ground.

The gauge 102 for measuring total precipitation can be a standard electronic rain gauge using a tipping bucket sensor 119. The runoff measurement device 114 can be a standard electronic rain gauge with a covered top to prevent rainfall from entering. The electronic gauge can be self-draining to minimize maintenance requirements.

The outflow circuit can incorporate a seal leg 150 in accordance with FIG. 9. For the embodiment shown in FIG. 13, the side outlet can be connected to a vented drip chamber 158. A runoff drain line 159 can connect the drip chamber 158 with the runoff measurement device 114.

Runoff from the seal leg 150 drips against atmospheric pressure into the drip chamber 158, and then drains via gravity flow through the runoff drain line 159 into the runoff measurement device 114. Use of a flexible drain line 159 eases the spacing tolerance between the collector tube 104 and gauge 114, simplifying installation.

Figure 14:
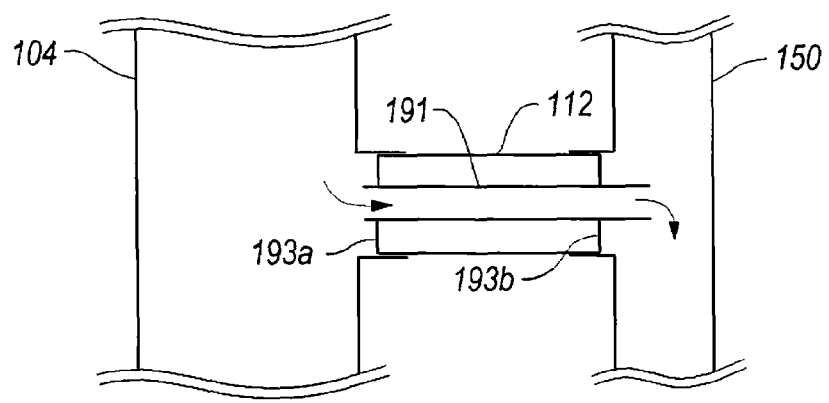
FIG. 14 is a schematic drawing of one embodiment of the runoff circuit in the runoff line with a capillary tube air seal in accordance with the present invention.

FIG. 14 illustrates another embodiment of the invention utilizing a tube of sufficiently small diameter for the flow element 113 in the runoff line 112 to provide for self-sealing via capillary action on the tube walls. A sufficiently small tube cannot support an internal vapor-liquid interface, requiring the tube to operate either dry or flooded. Such a capillary tube therefore does not require the use of vertical barriers at the inlet and outlet to seal against the backflow of pressurized air from the seal leg 150 to the collector tube 104.

The flow element 113 shown includes a small diameter tube 191 mounted concentrically inside the runoff line 112. Annular end caps 193a, 193b serve to support the inner tube 191 in the runoff line 112 and seal the annular space between the tubes, thereby forcing flow through the inner tube 191.

The invention is described above in reference to specific examples and embodiments. The metes and bounds of the invention are not to be limited by the foregoing disclosure, which is illustrative only, but should be determined in accordance with the full scope and spirit of the appended claims.

The invention claimed is:

1. A rain runoff gauge, comprising:
    a collector tube having an opening for receiving precipitation;
    an infiltration circuit providing a reference soil infiltration resistance in communication with the collector tube;
    a runoff circuit in communication with the collector tube providing runoff characteristics of a surface of the reference soil;
    a runoff measuring device to measure runoff from the runoff circuit.

2. The runoff gauge of claim 1, wherein the runoff circuit comprises a seal leg for operation of the runoff measuring device at atmospheric pressure.

3. The runoff gauge of claim 2, wherein the seal leg comprises:
    an upright outer tube having a side inlet connection, side outlet connection, top closure and bottom removable cap;
    an inner tube with an inlet end disposed within the outer tube below the side outlet connection, and an upper part extending transversely through the outlet connection of the outer tube.

4. The runoff gauge of claim 2, further comprising a balance line attached between an inlet to the seal leg and a ground surface to maintain a backpressure head in the runoff circuit matching a water depth above the ground surface.

5. The runoff gauge of claim 4 comprising a seal cap at an end of the balance line at the ground surface.

6. The runoff gauge of claim 5 wherein the seal cap provides an internal horizontal area at a ratio to an internal horizontal down-flow area of the seal leg that is at least 4:1.

7. The runoff gauge of claim 2, wherein the seal leg comprises: a U-tube, side inlet connection, side outlet connection, top closure for the tube end above the inlet, and removable cap for the tube end above the outlet.

8. The runoff gauge of claim 1, wherein the infiltration circuit includes a reference soil specimen.

9. The runoff gauge of claim 8 wherein a bottom of the reference soil specimen is in direct contact with a ground surface.

10. The runoff gauge of claim 1, wherein the runoff circuit includes an air backflow seal between the collector tube and the runoff measuring device.

11. The runoff gauge of claim 10, wherein the air backflow seal includes a capillary tube.

* * * * *